(12) United States Patent
Boudguiga et al.

(10) Patent No.: US 12,160,434 B2
(45) Date of Patent: Dec. 3, 2024

(54) CONFIDENTIAL METHOD FOR PROCESSING LOGS OF A COMPUTER SYSTEM

(71) Applicant: COMMISSARIAT A L'ENERGIE ATOMIQUE ET AUX ENERGIES ALTERNATIVES, Paris (FR)

(72) Inventors: Aymen Boudguiga, Antony (FR); Oana Stan, Massy (FR); Renaud Sirdey, Cernay-la-Ville (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 462 days.

(21) Appl. No.: 17/276,725

(22) PCT Filed: Sep. 16, 2019

(86) PCT No.: PCT/FR2019/052152
§ 371 (c)(1),
(2) Date: Mar. 16, 2021

(87) PCT Pub. No.: WO2020/058619
PCT Pub. Date: Mar. 26, 2020

(65) Prior Publication Data
US 2022/0038478 A1 Feb. 3, 2022

(30) Foreign Application Priority Data
Sep. 17, 2018 (FR) ........................................ 1858359

(51) Int. Cl.
*G06F 21/00* (2013.01)
*H04L 9/00* (2022.01)
(Continued)

(52) U.S. Cl.
CPC .......... *H04L 63/1425* (2013.01); *H04L 9/008* (2013.01); *H04L 9/065* (2013.01);
(Continued)

(58) Field of Classification Search
CPC ..... H04L 63/1425; H04L 9/008; H04L 9/065; H04L 9/3242; H04L 9/3247; H04L 9/3263; H04L 2209/46; G06N 3/02
See application file for complete search history.

(56) References Cited

U.S. PATENT DOCUMENTS

2014/0177828 A1* 6/2014 Loftus ................... H04L 9/0852
380/44
2018/0212754 A1* 7/2018 Williams ............ G06F 16/3344
(Continued)

FOREIGN PATENT DOCUMENTS

EP 3410630 A1 * 12/2018 ............. H04L 9/008
FR 3 060 165 A1 6/2018
(Continued)

OTHER PUBLICATIONS

Rajalakshmi et al., "Anonymizing log management process for secure logging in the cloud," 2014 International Conference on Circuits, Power and Computing Technologies [ICCPCT-2014], Nagercoil, India, 2014, pp. 1559-1564, doi: 10.1109/ICCPCT.2014.7055014. (Year: 2014).*
(Continued)

*Primary Examiner* — Michael M Lee
(74) *Attorney, Agent, or Firm* — Oblon, McClelland, Maier & Neustadt, L.L.P.

(57) ABSTRACT

The present invention concerns a method for processing system logs of a computer system. A system log generator (LG) transmits these system logs to a system log analyser (SIEM) after they have been encrypted by means of a symmetric encryption key and sends the symmetric encryp-
(Continued)

tion key in parallel with a homomorphic cryptosystem public key. The system log analyser carries out a transcryption of these logs then a processing thereof in the homomorphic domain. The result of the processing in the homomorphic domain is then transmitted to a security centre (SOC) or even directly to the system log generator to be decrypted there. The security centre can establish a security report or propose a countermeasure before sending it, in form encrypted by the symmetric key, to the system log generator.

14 Claims, 3 Drawing Sheets

(51) Int. Cl.
  *H04L 9/06* (2006.01)
  *H04L 9/32* (2006.01)
  *H04L 9/40* (2022.01)
(52) U.S. Cl.
  CPC .......... *H04L 9/3242* (2013.01); *H04L 9/3247* (2013.01); *H04L 9/3263* (2013.01)

(56) References Cited

U.S. PATENT DOCUMENTS

| | | | |
|---|---|---|---|
| 2019/0081960 A1* | 3/2019 | Kupfer | H04L 63/1416 |
| 2019/0334708 A1 | 10/2019 | Carpov et al. | |
| 2020/0019867 A1* | 1/2020 | Nandakumar | G06N 3/048 |

FOREIGN PATENT DOCUMENTS

| | | | | |
|---|---|---|---|---|
| WO | WO-2013153628 A1 | * | 10/2013 | ............ H04L 9/008 |
| WO | WO 2018/065707 A1 | | 4/2018 | |

OTHER PUBLICATIONS

Xie, P, et al. "Crypto-nets: Neural networks over encrypted data." arXiv preprint arXiv:1412.6181 (2014). (Year: 2014).*
International Search Report issued on Nov. 22, 2019 in PCT/FR2019/052152 filed on Sep. 16, 2019, 3 pages.
French Preliminary Search Report (with English translation of Categories of Cited Documents) issued on Jun. 21, 2019 in French Application 1858359 filed on Sep. 17, 2018, 3 pages.
Ray, I. et al., "Secure Logging As a Service-Delegating Log Management to the Cloud," IEEE Systems Journal, vol. 7, No. 2, 2013, pp. 323-334, XP011505076.
Carpov, S. et al., "Practical Privacy-Preserving Medical Diagnosis using Homomorphic Encryption," 2016 IEEE 9th International Conference on Cloud Computing, 2016, pp. 593-599, XP033047954.
Lin, X. et al., "Log Analysis in Cloud Computing Environment With Hadoop and Spark," Proceedings of IEEE IC-BNMT2013, 2013, pp. 273-276.
Graepel, T. et al., "ML Confidential: Machine Learning on Encrypted Data," Information Security and Cryptology—Lecture Notes in Computer Science, vol. 7839, 2012, 15 total pages.
Bourse, F. et al., "Fast Homomorphic Evaluation of Deep Discretized Neural Networks," Advances in Cryptology—CRYPTO 2018, Lecture Notes in Computer Science, vol. 10993, 2018, pp. 1-30.
U.S. Appl. No. 16/467,851, filed Jun. 7, 2019, US 2019/0334708 A1, Sergiu Carpov, et al.
U.S. Appl. No. 16/899,056, filed Jun. 11, 2020, US 2020/0394518 A1, Renaud Sirdey, et al.
U.S. Appl. No. 17/259,092, filed Jan. 8, 2021, Joel Cathebras, et al.
U.S. Appl. No. 17/259,065, filed Jan. 8, 2021, Joel Cathebras, et al.

* cited by examiner

CONFIDENTIAL METHOD FOR PROCESSING LOGS OF A COMPUTER SYSTEM

TECHNICAL FIELD

The present invention generally relates to the field of computer security and more particularly to the Security Information and Event Management or SIEM.

STATE OF PRIOR ART

Cybersecurity has become a major issue for owners and users of information systems (IS). One of the known approaches to protect an information system is to collect events occurring in the various pieces of equipment that make it up, such as routers, servers, firewalls, databases, network nodes, etc. Given the frequency, variety and amount of these events, they cannot generally be processed on the fly. For this reason, events are recorded within system logs, for deferred processing purposes. The system logs relating to the different pieces of equipment are then filtered and correlated with each other so that the occurrence of anomalies or risk situations can be identified and, if necessary, notified to the system administrator.

Numerous tools capable of analysing system logs, known under the acronym SIEM (Security Information Event Management), are available on the market. As these tools are becoming more and more complex and expensive, a recent trend is to offer these tools in the form of Software as a Service (SaaS), that is to transfer the analysis of system logs to remote servers or a Cloud platform.

For example, a description of an SIEM tool for a Cloud environment will be found in the paper by X. Lin et al. entitled "Log analysis in cloud computing environment with Hadoop and Spark", published in Proc. of IEEE Intl Conference on Broadband Network & Multimedia Technology, IC-BNMT 2103, pp. 273-276.

In such a context of transferred analysis (remote server or Cloud platform), the problem of security of data transmission as well as that of data processing confidentiality arises.

First of all, when logs from different hardware or software elements of an information system are transmitted to an SIEM tool, they can be intercepted by a hacker. The latter can then take advantage of the time required to analyse the logs and deploy countermeasures to make use of the vulnerability of the information system during the incident and attack it. This attack can be all the more dangerous as it relates to a standard element used in a large number of information systems. For example, an intrusion detection system or IDS may indicate the presence of malware disclosing identifiers and passwords of users of some type of database. The hacker can then use this same malware to recover this confidential data for other databases of the same type.

Furthermore, an honest but curious SIEM tool can make use of information from the logs for commercial purposes, for example to identify risky system elements and sell solutions to computer security professionals. It can just as easily make dishonest use of it by informing hackers about potential targets and cause massive attacks on vulnerable components.

Finally, protecting the integrity and confidentiality of logs is essential when law enforcement agencies need to investigate computer hacking. Again, an adversary could seize confidential information either to attack the company under investigation or to attack computer systems having the same vulnerable component.

It is therefore important to ensure confidentiality of the information contained in system logs as well as the result of their processing when this is carried out on a remote server or Cloud platform.

Some SIEM tools such as IBM™ QRadar™ make it possible to store historised (that is time-stamped) events of an information system on an external device while implementing confidentiality protection measures, such as hash addressing of these events and obfuscation of the stored data. Other SIEM tools also make it possible to encrypt, using a conventional symmetric encryption algorithm such as AES, data transmitted between their various software components.

However, current remote SIEM tools do not ensure confidentiality of data present in the system logs when they are processed, nor the confidentiality of the result of this processing.

The purpose of the present invention is therefore to provide a method for processing logs of an information system that ensures confidentiality of the processing as well as confidentiality of the result of this processing.

DISCLOSURE OF THE INVENTION

The present invention is defined by a method for processing system logs of an information system comprising a system log generator, said system logs being transmitted to a system log analyser for analysis, the result of the analysis being transmitted to a security operations centre to establish a security report or provide a countermeasure to said generator, the system log analyser and the security operations centre being remote from the system log generator, the security operations centre having a private key (HE.sk) and a public key (HE.sk) of a homomorphic cryptosystem, said public key having been previously transmitted to the system log generator and the system log analyser, the method according to the invention being particular in that:

the system log generator generates a symmetric encryption key ($K_{sym}$) and then encrypts this key by means of the homomorphic public encryption key (HE.pk) and transmits the thus-encrypted public key (Enc(HE.pk, $K_{sym}$) to the system log analyser;

the system log generator encrypts a system log using the symmetric key ($K_{sym}$) and transmits it thus encrypted to the system log analyser;

the system log analyser performs, by means of said encrypted public key, transcryption of the encrypted log to obtain a system log encrypted by the homomorphic public encryption key, then performs processing of this log in the homomorphic domain to obtain an analysis result in the homomorphic domain (Enc (HE.pk,r)), the analysis result in the homomorphic domain and the symmetric key encrypted by the homomorphic public encryption key being transmitted to the security operations centre;

the security operations centre decrypts, using the secret key of the homomorphic cryptosystem, the symmetric key encrypted by the homomorphic public encryption key, as well as the analysis result obtained in the homomorphic domain, to obtain the symmetric key and the analysis result in cleartext, respectively, establishes a security report or provides a countermeasure based on the cleartext analysis result, encrypts the security report or countermeasure by means of the symmetric key before transmitting the thus-encrypted security report or countermeasure to the system log generator;

the system log generator decrypts the security report or countermeasure using the thus-encrypted symmetric key to obtain the cleartext security report or countermeasure.

Advantageously, the information system comprises a system log generator (LG), said system logs being transmitted to a system log analyser (SIEM) for analysis, the result of the analysis (r) being intended for the system log generator, the system log analyser being remote from the system log generator, the system log generator having a private key (HE.sk) and a public key (HE.pk) of a homomorphic cryptosystem, said public key having previously been transmitted to the system log analyser, the system log generator generates a symmetric encryption key ($K_{sym}$) and then encrypts this key by means of the homomorphic public encryption key (HE.pk) and transmits the thus-encrypted public key (Enc(HE.pk, $K_{sym}$)) to the system log analyser;

the system log generator encrypts a system log using the symmetric key ($K_{sym}$) and transmits it thus encrypted to the system log analyser;

the system log analyser performs, by means of said encrypted public key, transcryption of the encrypted log to obtain a system log encrypted by the homomorphic public encryption key and then performs processing of this log in the homomorphic domain to obtain an analysis result in the homomorphic domain (Enc(HE.pk,r)), the analysis result in the homomorphic domain being transmitted to the system log generator;

the system log generator decrypts, using the secret key of the homomorphic cryptosystem, the homomorphic-domain analysis result to obtain the cleartext analysis result.

The system log analyser performs transcryption of the log encrypted by the symmetric key (Enc(HE.pk,log*)) by encrypting it a second time with the public key of the homomorphic encryption, and then by decrypting the log encrypted a second time in the homomorphic domain, by means of the symmetric key encrypted with the public key of the homomorphic encryption (Enc(HE.pk,$K_{sym}$)), Symmetric encryption is preferably stream encryption.

Log processing in the homomorphic domain can be a signature-based event analysis or a behavioural analysis of at least one element of the information system.

Processing the log in the homomorphic domain can be performed by a machine learning method.

The machine learning method uses a linear classification model or even a neural network.

The system log generator can calculate a hash function-encrypted log fingerprint or a message authentication code, and transmits the fingerprint or MAC code, together with the thus-encrypted log, to the system log analyser.

In one example of application, the system log generator is part of an intrusion detection system (IDS) of the operating system.

BRIEF DESCRIPTION OF THE DRAWINGS

Further characteristics and advantages of the invention will appear upon reading a preferential embodiment of the invention, described with reference to the appended figures in which.

DETAILED DISCLOSURE OF PARTICULAR EMBODIMENTS

In the following, an information system (or computer system) comprising a set of devices distributed over one or more networks connected to the Internet, such as terminals (being mobile or not), sensors, gateways, servers, etc is considered. Cases of use in question here are not only those of conventional local networks (corporate networks especially) but also connected object networks or IoT (Internet of Things), smart grids, intelligent transportation systems or ITS, home systems networks, etc.

In general, devices of the system can support different types of communication. For example, they can communicate with each other directly on a peer-to-peer basis or via a local area network (device to device communication), they can communicate with a gateway (device to gateway communication), for example to aggregate data in the case of an IoT application, and finally they can access remote servers or even Cloud platforms via the Internet (device to Cloud communication).

Some of these devices can be equipped with system log generators. For example, Intrusion Detection Systems (IDS), firewalls, gateways or servers can host such log generators.

These system logs can be stored and automatically analysed by SIEM tools hosted by servers or cloud platforms.

The results of this automatic analysis can be used by Security Operations Centres or SOCs. These security centres can generate reports, provide or deploy countermeasures to remedy possible failures (patch deployment or quarantine, for example).

A description of the different functionalities of a log generator, an SIEM tool and a security centre SOC can be found in the document providing recommendations of the NIST (National Institute of Standards and Technology) entitled "Guide to computer security log management", K. Kent and M. Souppaya, published in September 2006.

Figure 1:
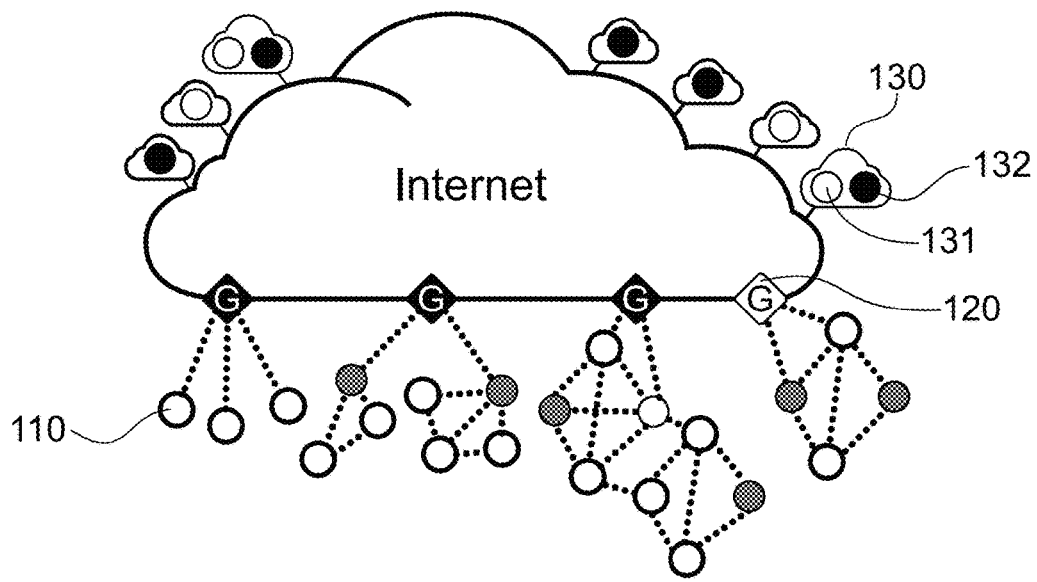
FIG. 1 schematically represents an infrastructure in which the method for processing system logs according to the present invention can be implemented.
Figure 1:
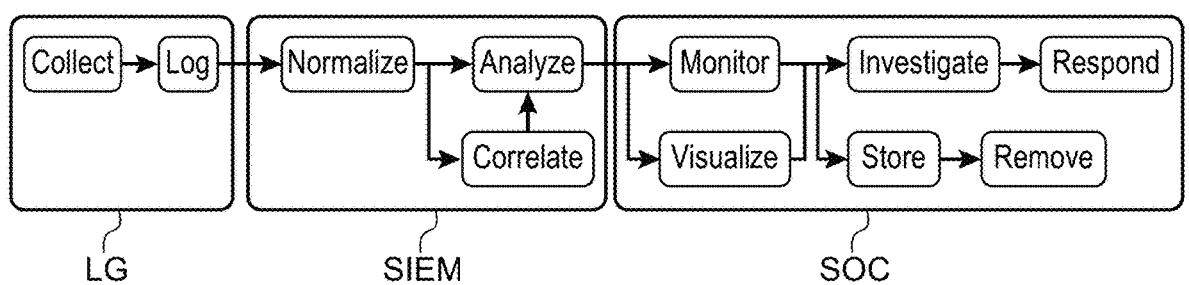

FIG. 1 schematically represents a system log management infrastructure on which the system log processing method according to the present invention can be implemented.

In this figure, a plurality of devices, 110, such as workstations, terminals, sensors, gateways, firewalls, servers being part of an information system are represented. These devices may be connected together by wired or wireless links within a local area network and/or connected to the Internet via a gateway, 120. Some of these devices (represented in grey) can be equipped with log generators. System logs can be transmitted via the Internet to a remote server or cloud platform. The components of such a platform, including SIEM tools, 131, and/or security centres SOCs, 132, have been represented in 130. An SIEM tool and a security centre can be hosted on separate servers or on the same server.

At the bottom of the figure, the functional architecture of a log generator, LG, a log analyser, SIEM, and a security centre, SOC has been set out.

The log generator is responsible for collecting events affecting the device on which it is hosted and listing them in a system log. For example, the log generator of an Intrusion Detection System (IDS) may report events related to abnormal or suspicious activities on a host machine (HIDS for Host IDS) or a network (NIDS for Network IDS).

In practice, such a log is in the form of a time-stamped list of events, each event being described by information such as, for example, the type of event, a status of a software or hardware component, or an error code. The main events are those related to an authentication or authorization procedure, connection success or failure, heavy network traffic, virus detection, or critical system errors.

In some cases, the log generator can perform normalisation of the system logs before transmitting them. More precisely, event characteristics, such as timestamp information, protocol levels, port numbers, IP addresses, etc., are filled-in in various fields in a predetermined format, for example of the XML type.

The system logs are then transmitted as they are received or stored locally for transmission to the SIEM tool on request. The SIEM tool can include several agents (agent-based SIEM), installed in the log generators, responsible for periodically transmitting the system logs to the analysis module. Alternatively, the SIEM tool may have no agent (agent-less SIEM), in which case it receives the system logs directly from the log generator(s).

First of all, the SIEM tool can take the normalisation operation in charge if this has not been previously carried out by the log generator.

The SIEM tool performs a correlation between two or more system log events (or a plurality of system logs received from different log generators). The correlation module aims at matching events from one source (or several sources) based on their characteristics, for example their timestamp information, event types, IP addresses. The events thus matched are then provided to the analysis module of the SIEM tool.

This analysis can be carried out based on a method using predefined rules (also called signatures) or a behavioural method.

Signature-based analysis uses a set of rules associated with already known attack scenarios (mainly based on experience feedback). In other words, if the analysis module detects a configuration of events corresponding to such a scenario, it matches these events within a same set and associates an attack scenario identifier to it.

Examples of such rules include the detection of network traffic with a start or destination address listed as malicious, a number of unsuccessful login attempts on one or more machines in the system which is above a predetermined threshold for a given period of time, the creation of a new user account immediately followed by login activity.

Conversely, when the correlation is based on a behavioural approach, it does not use prior knowledge of attack scenarios but relies on the normal behaviour of the information system elements over time. When a configuration of events deviates from this normal behaviour, these events are matched and, where appropriate, a level of risk associated with this configuration is estimated.

Event correlation can be performed on-the-fly by receiving the events or off-line by reading the log file.

The SIEM tool further includes an analysis module to, on the basis of the events received and, where appropriate, correlated, detect vulnerabilities, identify risks or incidents. It can combine past events with events occurring in real time as well as use information relating to the context in which these events happened. The analysis module advantageously uses a machine learning algorithm, typically a supervised or unsupervised classification algorithm. This classification algorithm will be able to classify combinations of events into the following situation categories: "normal", "dangerous" and "unknown".

The results of the SIEM analysis are then provided to the security centre, which can provide countermeasures or deploy them automatically.

The idea underlying the invention is to provide processing of the logs after homomorphous transcryption so that the SIEM tool has no possibility of accessing the cleartext system logs.

It is remembered that homomorphic encryption makes it possible to perform operations (in practice arithmetic addition or multiplication operations) on data without ever revealing them. Homomorphic encryption is a (generally asymmetric) encryption $Enc_{pk}$ (of public key pk) verifying the following property:

$$Enc_{pk}:\Omega \to \Gamma$$

$$Dec_{sk}[Enc_{pk}(a) \oplus Enc_{pk}(b)] = a+b \quad (1)$$

where $\Omega$ is the cleartext message space (more simply called the cleartext space) and $\Gamma$ is the encrypted message space (more simply called the encrypted space), + an additive operation in the cleartext space conferring $\Omega$ a group structure, $\oplus$ an operation in the encrypted space conferring $\Gamma$ a group structure. It is thus understood that the application of $(\Omega, +)$ is a group homomorphism. $Dec_{sk}$ is the decryption function corresponding to $Enc_{pk}$ (where sk is the user's secret key). Alternatively, the group homomorphism can be a multiplicative homomorphism.

It results from expression (1) that it is possible to perform an additive operation between two cleartexts (a, b) from a corresponding operation between their corresponding encrypted messages ($Enc_{pk}(a)$, $Enc_{pk}(b)$).

More generally, a homomorphic encryption can be considered as a ring morphism between the cleartext space (provided with the operations +, ×) and the encrypted space (provided with the corresponding operations $\oplus$, $\otimes$). The following properties are then satisfied:

$$Dec_{sk}(Enc_{pk}(a+b)) = Dec_{sk}(Enc_{pk}(a) \oplus Enc_{pk}(b)) = a+b \quad (2\text{-}1)$$

$$Dec_{sk}(Enc_{pk}(a \times b)) = Dec_{sk}(Enc_{pk}(a) \otimes Enc_{pk}(b)) = a \times b \quad (2\text{-}2)$$

The previous definitions have been given in the case of additive and multiplicative operations, but it is understood that any pair of operations providing the encrypted space with a ring structure can be contemplated.

Using expressions (2-1) and (2-2), it is possible to evaluate any function $f$, which can be resolved into elementary addition and multiplication operations, in the encrypted space and then to decrypt the result.

In the following disclosure, notations Enc(HE.pk,a) and Dec(HE.sk,x) instead of $Enc_{pk}(a)$ and $Dec_{sk}(x)$ will be used to designate a homomorphic encryption operation (of a) with the public key HE.pk and a homomorphic decryption operation (of X) using the private key HE.sk respectively.

Transcryption is a cryptographic technique that makes it possible to switch from data encrypted by a first cryptosystem to the same data encrypted by a second cryptosystem, without passing through an intermediate decryption step in the cleartext space.

The present secure classification method uses transcryption for switching from a symmetric encryption, advantageously a stream encryption, to a homomorphic encryption. It is remembered that a stream encryption is a symmetric encryption in which the message to be encrypted is simply added bit by bit with a key stream generated from a symmetric key. Decryption is carried out like encryption, by simply adding the encrypted data bit by bit with the key stream.

If a denotes a cleartext data, $S(K_{sym},a)$ the data encrypted by symmetric encryption S (that is by addition with the key stream in the case of stream encryption), $S^{-1}$ the decryption operation (identical to S in the case of stream encryption) and $S_{HE}^{-1}$ the same decryption operation in the homomorphic domain:

$$S_{HE}^{-1}(\text{Enc}(HE.pk,K_{sym}),\text{Enc}(HE.pk,S(K_{sym},a)),)=\text{Enc}(HE.pk,a) \qquad (3)$$

In other words, it is possible to decrypt in the homomorphic domain (that is in the homomorphic encrypted message domain) a piece of data encrypted a first time by symmetric encryption ($S(K_{sym}, a)$) and a second time by homomorphic encryption.

However, the transcryption operation (3) presupposes that decryption in the homomorphic domain, $S_{HE}^{-1}$, is possible, in other words that it can be performed in the homomorphic domain by means of the aforesaid elementary operations ⊕, ⊗. In the case of stream decryption, being carried out by a simple addition with the key stream, it is understood that it can be carried out in the homomorphic domain by means of the encrypted symmetric key $\text{Enc}(HE.pk,K_{sym})$.

Figure 2:
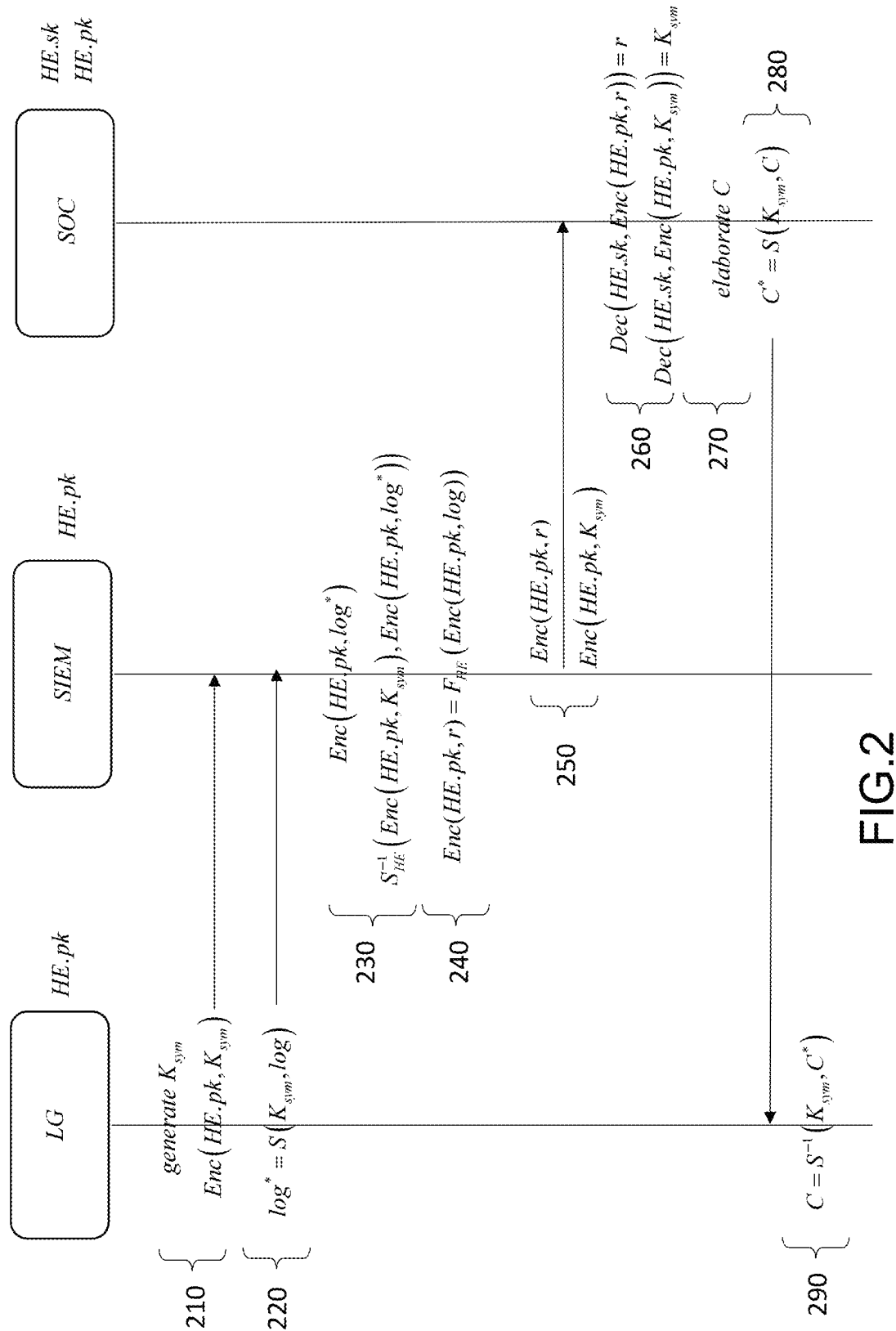
FIG. 2 schematically represents the time chart of a method for processing system logs according to a first embodiment of the invention.

FIG. 2 schematically represents the time chart of a method for processing system logs according to a first embodiment of the invention.

This processing method can be implemented in a system log management infrastructure as represented in FIG. 1.

In FIG. 2, the three entities conventionally involved in system log management have been distinguished, namely: the log generator, LG, the log analysis tool (or system log analyser), SIEM and the security operations centre, SOC.

As previously indicated, the log generator may be part of, for example, an intrusion detection system, a firewall, etc. It is hosted by an element of the information system that should be protected.

On the other hand, the log analysis tool SIEM as well as the security operations centre are remote from the log generator. They can be located on remote servers or managed as a service by a Cloud platform.

It is assumed that the security operations centre, SOC, has generated a secret key HE.sk for homomorphic encryption. In other words, it has an asymmetric homomorphic cryptosystem characterised by the pair of keys (HE.sk, HE.pk). It is further assumed that the public key HE.pk has been transmitted to the log generator, LG, and to the log analysis tool, SIEM.

In step 210, the log generator, LG, generates a secret key $K_{sym}$ for symmetric encryption S. This symmetric key can be periodically renewed or after a predetermined number of system logs have been transmitted, or even at each new system log. The generator LG encrypts the symmetric key by means of the public key of the homomorphic cryptosystem, and transmits the thus-encrypted key, $\text{Enc}(HE.pk, K_{sym})$, to the log analysis tool.

In step 220, the log generator encrypts a system log log (or part of it) by means of the symmetric key, $K_{sym}$, and transmits this thus-encrypted log, $\log^* = S(K_{sym}, \log)$, to the log analysis tool.

It will be understood that transmitting the encrypted symmetric key $\text{Enc}(HE.pk,K_{sym})$ may be prior, concomitant or subsequent to step 220. Furthermore, transmitting the encrypted key will be omitted if it has already been transmitted in a previous step.

The log analysis tool then transcrypts the system log in 230 and performs processing/analysis of the log on its transcrypted version in 240. More precisely, the tool SIEM first performs homomorphic encryption of the log already encrypted by the symmetric key $\text{Enc}(HE.pk, \log^*)$ and then decrypts log* in the homomorphic domain using $\text{Enc}(HE.pk,K_{sym})$, that is:

$$S_{HE}^{-1}(\text{Enc}(HE.pk,K_{sym}),\text{Enc}(HE.pk,\log^*))=\text{Enc}(HE.pk, \log) \qquad (4)$$

Log processing/analysis is then performed in 240 in the homomorphic domain on $\text{Enc}(HE.pk, \log)$ using a Machine Learning (ML) algorithm using a classification model, for example a linear classification model with binary output (also called logistic regression). This processing is noted $F_{HE}$ in the homomorphic domain and F in the cleartext space. A presentation of a classifier ML operating within a homomorphic domain can be found in the paper by T. Graepel et al. entitled "ML confidential, Machine Learning on encrypted data" published in the book by Kwon T., Lee M K., Kwon D. (eds) Information Security and Cryptology—ICISC 2012. ICISC 2012. Lecture Notes in Computer Science, vol 7839. Springer, Berlin, Heidelberg.

In the following, $x=(x_1,x_2, \ldots, x_N)$ denotes an observation of an event or even a combination of events, where $x_1, \ldots, x_N$ are the parameters observed, also called predictive variables. Thus, for example, these predictive variables could be a number of connection requests, a latency time, a number of system errors of some type, etc.

It is remembered that logistic regression generally consists in calculating a score function expressed as a linear combination of the N predictive variables $x_1, \ldots, x_N$ relating to the observation, that is:

$$SC=a_1x_1+a_2x_2+\ldots+a_Nx_N \qquad (5)$$

and in classifying this observation according to the comparison of this score function with a threshold value.

As the score function has a linear expression, it can be evaluated in the homomorphic domain. The comparison can, in some cases, be carried out in this domain. Preferably, however, the value of the score function is transmitted as a result in the homomorphic domain, and the comparison is thereby carried out by the security operations centre, SOC, as will be seen below.

The score function enables the observation space to be splitted into two zones separated by a hyperplane and allows an observation to be classified in either of these zones. In general, it is possible to divide the observation space into a plurality of zones using a plurality of score functions.

Other automatic learning methods are also contemplatable provided that the models used can be evaluated in the homomorphic domain. Thus, for example, a neural network can be used to perform an analysis based on the characteristics of the events. A description of a neural network evaluated in the homomorphic domain can be found in the paper by F. Bourse et al. entitled "Fast homomorphic evaluation of deep discretized neural networks", 2018 published in the book by Shacham H., Boldyreva A. (eds) Advances in Cryptology—CRYPTO 2018. CRYPTO 2018. Lecture Notes in Computer Science, vol 10993. Springer, Cham.

The result obtained by processing/analysing the system log in the homomorphic domain in 240 is noted $\text{Enc}(HE.pk, r)$, with:

$$\text{Enc}(HE.pk,r)=F_{HE}(\text{Enc}(HE.pk, \log)) \qquad (6)$$

In step 250, the analysis tool, SIEM, transmits to the security operations centre, SOC, the encrypted result in the homomorphic domain Enc(HE.pk,r), obtained in the previous step, as well as the symmetric key encrypted by the public key of the homomorphic cryptosystem, that is Enc(HE.pk,$K_{sym}$), which had been received from the log generator, LG. Again, the transmission of the latter key may be omitted if it has been previously transmitted to the centre SOC with a previous result.

The security operations centre, SOC, decrypts in 260, Enc(HE.pk,r), by means of the private key HE.sk of the homomorphous cryptosystem (it has generated) to recover the cleartext result:

$$Dec(HE.sk,Enc(HE.pk,r))=r \quad (7)$$

From the result r, the centre SOC determines in 270 the countermeasure to be applied or establishes a report, which is noted C.

Thus, for example, an event can be classified according to the result r as dangerous, unknown, or harmless and establishes a report accordingly. Alternatively or additionally, it may provide a countermeasure, for example, quarantine or patch deployment.

In any case, the provided report/countermeasure, C, is encrypted in 280 by means of the symmetric key $K_{sym}$, which has been previously decrypted by means of the private key HE.sk:

$$Dec(HE.sk,Enc(HE.pk,K_{sym}))=K_{sym} \quad (8)$$

The report/countermeasure thus encrypted by $K_{sym}$, that is $C^*=S(K_{sym},C)$ is then transmitted by the centre SOC to the log generator which decrypts it in 290 using the symmetric key $K_{sym}$ to obtain C. The log generator thus obtains the cleartext security report/countermeasure.

It will be noted that the SIEM tool processes the system logs in complete confidentiality, it has access neither to the contents of these logs since it does not have the symmetric key $K_{sym}$, nor to the result of the analysis of these logs since it does not have the secret key HE.sk. Nor does the SOC Centre have access to the content of the logs, since it only has the result.

It should be noted that the SIEM tool can receive system logs from a plurality M of log generators using respective symmetric keys $K_{sym}^m$, m=1, . . . , M and analyse them together if necessary. Indeed, after the transcryption operation, the different logs are available in the same homomorphic domain and are therefore likely to be processed together by the same machine learning algorithm of the type disclosed above.

Figure 3:
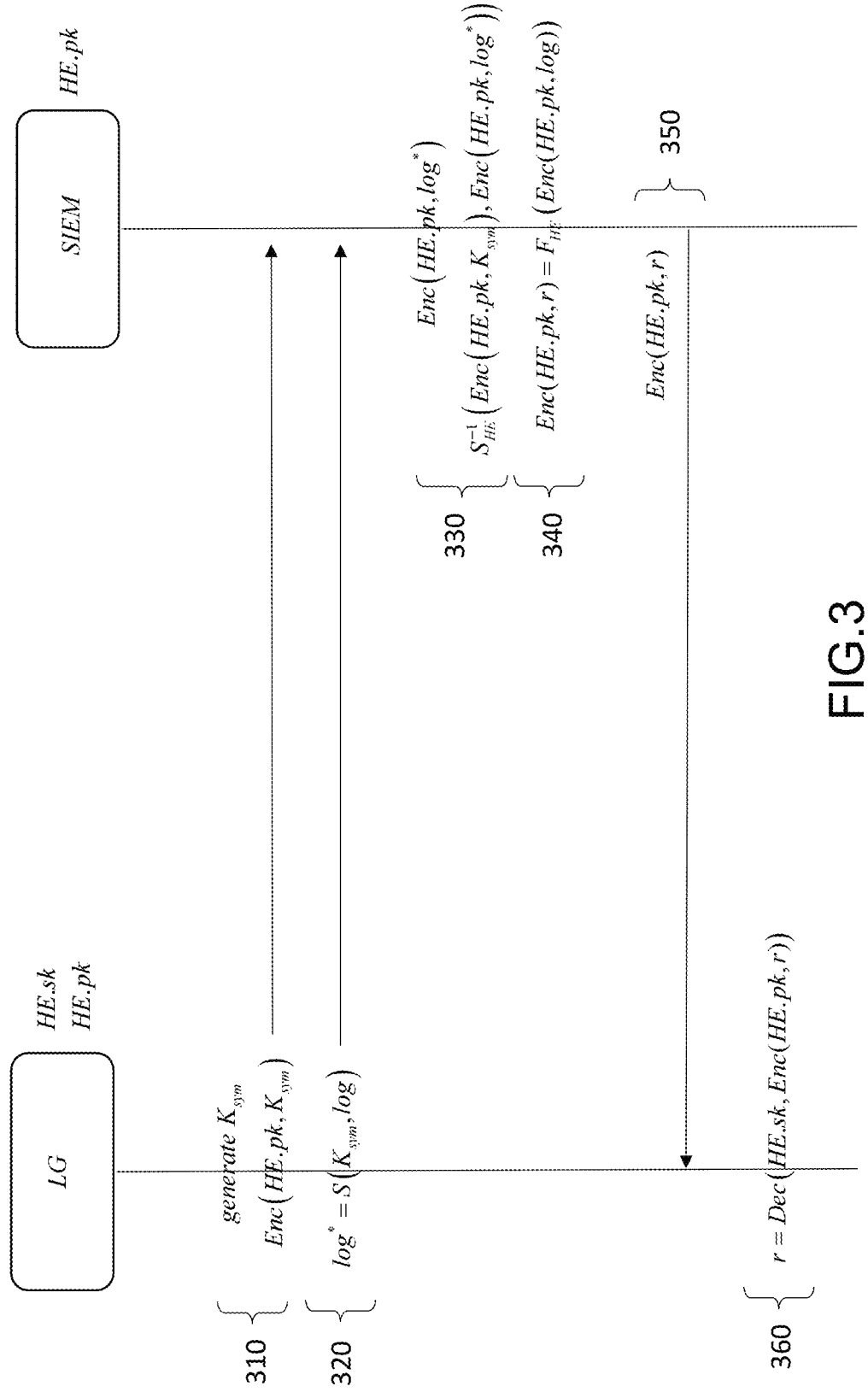
FIG. 3 schematically represents the time chart of a method for processing system logs according to a second embodiment of the invention.

FIG. 3 schematically represents the time chart of a method for processing system logs according to a second embodiment of the invention.

This second embodiment differs from the first one in that it does not implement a security operations centre. The result of the analysis is directly transmitted to the log generator.

The system log generator has been referred to as LG and the log analyser as SIEM. As before, it is assumed that the log analyser is remote from the information system, whether it is hosted by a remote server or provided as a service by a cloud platform It is assumed that the log generator has generated a secret key HE.sk for homomorphic encryption. In other words, it has a homomorphic cryptosystem (HE.sk, HE.pk). This public key HE.pk has been transmitted (in cleartext) to the log analyser, SIEM.

In step 310, the log generator generates a secret key $K_{sym}$ of a symmetric encryption method S. As in the first embodiment, the symmetric key can be periodically renewed or after a predetermined number of system logs have been transmitted. Further, it encrypts the symmetric key $K_{sym}$ using the public key of the homomorphic cryptosystem, and transmits the thus-encrypted key Enc(HE.pk,$K_{sym}$) to the log analysis tool.

In step 320, the log generator, LG, encrypts a system log using the symmetric key, $K_{sym}$, and transmits the encrypted log, log*=S($K_{sym}$, log), to the Log Analysis Tool.

The step of sending this key encrypted in 310 may be prior, concomitant or subsequent to that of the log encrypted in 320, or may be omitted if the encrypted key has already been sent in a previous log.

In step 330, the log analysis tool performs transcryption of the system log to obtain the encrypted log in the homomorphic domain Enc(HE.pk, log).

In step 340, the tool performs processing/analysis of the log on its transcrypted version, Enc(HE.pk, log). This step is identical to step 240, and the same alternative contemplated for the first embodiment also find application here. At the end of processing/analysis, the result is obtained in the homomorphic domain, that is Enc(HE.pk,r).

This result is then transmitted in 350 to the log generator which can decrypt it in 360 by means of the private key of the homomorphic cryptosystem:

$$Dec(HE.sk,Enc(HE.pk,r))=r \quad (9)$$

As in the first embodiment, it will be noted that the log analyser has access neither to the content of the logs, nor to the result of their analysis. If necessary, it can receive and analyse logs from a plurality of log generators of the information system.

In both embodiments disclosed above, a mechanism may be provided for verifying integrity of the logs encrypted by the symmetric key, so that the log analyser can ensure that the logs transmitted have not been modified by a possible attacker. Verifying integrity of a log will be made possible by attaching to it, for example, its fingerprint (hash) or Message Authentication Code (MAC), in a manner known per se.

It will also be possible to provide a mechanism for authenticating various entities involved in the method for processing system logs (LG, SIEM and SOC), for example by producing public key certificates (for example according to the X509 standard) or even more simply by using identifier and password. The authentication step will of course be prior to exchanges between these entities, as represented in FIGS. 2 and 3.

The invention claimed is:

1. A method for processing system logs of an information system comprising a system log generator, the system logs being transmitted to a system log analyzer for analysis, a result of the analysis being transmitted to a security operations center to establish a security report or provide a countermeasure to the system log generator, the system log analyzer and the security operations center being remote from the system log generator, wherein the security operations center has a private key as well as a public key of a homomorphic cryptosystem, the public key having been previously transmitted to the system log generator and the system log analyzer, the method comprising:
   the system log generator generating a symmetric encryption key, then encrypting the symmetric encryption key by means of the public key of the homomorphic cryptosystem, and transmitting the encrypted symmetric encryption key to the system log analyzer;
   the system log generator encrypting a system log using the symmetric encryption key and transmitting the encrypted system log to the system log analyzer;

the system log analyzer (1) performing, by means of the encrypted symmetric encryption key, transcryption of the encrypted system log to obtain a system log encrypted by the public key of the homomorphic cryptosystem, (2) performing processing of the encrypted system log in a homomorphic domain to obtain an analysis result in the homomorphic domain, the processing including applying a set of predefined rules as signatures, to obtain the analysis result, and (3) transmitting the analysis result in the homomorphic domain as well as the encrypted symmetric encryption key to the security operations center;

the security operations center decrypting, using the private key of the homomorphic cryptosystem, the encrypted symmetric encryption key, as well as the analysis result obtained in the homomorphic domain, to obtain the symmetric encryption key and a cleartext analysis result, respectively, establishing a security report or providing a countermeasure from the cleartext analysis result, encrypting the security report or countermeasure by means of the symmetric encryption key, and transmitting the encrypted security report or countermeasure to the system log generator;

the system log generator decrypting, by means of the symmetric encryption key, the encrypted security report or countermeasure to obtain the cleartext security report or countermeasure.

2. The method for processing the system logs of the information system according to claim 1, further comprising the system log analyzer performing transcryption of the log encrypted by the symmetric encryption key by encrypting the system log a second time by the public key of the homomorphic cryptosystem and then decrypting the system log encrypted the second time in the homomorphic domain, by means of the symmetric encrypted key encrypted by the public key of the homomorphic cryptosystem.

3. The method for processing the system logs of the information system according to claim 2, wherein encrypting the system log comprises encrypting using stream encryption.

4. The method for processing the system logs of the information system according to claim 1, wherein the processing of the system log in the homomorphic domain is performed by a machine-learning method.

5. The method for processing the system logs of the information system according to claim 4, wherein the machine-learning method uses a linear classification model.

6. The method for processing the system logs of the information system according to claim 4, wherein the machine-learning method uses a neural network.

7. The method for processing the system logs of the information system according to claim 1, further comprising the system log generator calculating a hash function-encrypted log fingerprint or message authentication code, and transmitting the fingerprint or a MAC code together with the encrypted system log to the system log analyzer.

8. The method for processing the system logs of the information system according to claim 1, wherein the system log generator is part of an Intrusion Detection System (IDS) of an operating system.

9. The method for processing the system logs of the information system according to claim 1, wherein the set of predefined rules is associated with known attack scenarios.

10. The method for processing the system logs of the information system according to claim 9, wherein the processing includes correlating two or more events in the encrypted system log, and the set of predefined rules, or the behavioral method, is applied to the correlated two or more events to obtain the analysis result.

11. A method for processing system logs of an information system comprising a system log generator, the system logs being transmitted to a system log analyzer for analysis, a result of the analysis being intended for the system log generator, the system log analyzer being remote from the system log generator, wherein, the system log generator has a private key as well as a public key of a homomorphic cryptosystem, the public key having previously been transmitted to the system log analyzer, the method comprising:

the system log generator generating a symmetric encryption key, then encrypting the symmetric encryption key by means of the public key of the homomorphic cryptosystem, and transmitting the encrypted symmetric encryption key to the system log analyzer;

the system log generator encrypting a system log using the symmetric encryption key and transmitting the encrypted system log to the system log analyzer;

the system log analyzer (1) performing, by means of the encrypted symmetric encryption key, transcryption of the encrypted system log to obtain a system log encrypted by the public key of the homomorphic cryptosystem, (2) performing processing of the encrypted system log in a homomorphic domain to obtain an analysis result in the homomorphic domain, the processing including applying a set of predefined rules as signatures, to obtain the analysis result, and (3) transmitting the analysis result in the homomorphic domain to the system log generator; and the system log generator decrypting, using the private key of the homomorphic cryptosystem, the analysis result obtained in the homomorphic domain, to obtain a cleartext analysis result.

12. The method for processing the system logs of the information system according to claim 11, wherein the set of predefined rules is associated with known attack scenarios.

13. The method for processing the system logs of the information system according to claim 12, wherein the processing includes correlating two or more events in the encrypted system log, and the set of predefined rules, or the behavioral method, is applied to the correlated two or more events to obtain the analysis result.

14. A method for processing system logs of an information system comprising a system log generator, the system logs being transmitted to a system log analyzer for analysis, a result of the analysis being transmitted to a security operations center to establish a security report or provide a countermeasure to the system log generator, the system log analyzer and the security operations center being remote from the system log generator, wherein the security operations center has a private key as well as a public key of a homomorphic cryptosystem, the public key having been previously transmitted to the system log generator and the system log analyzer, the method comprising:

the system log generator generating a symmetric encryption key, then encrypting the symmetric encryption key by means of the public key of the homomorphic cryptosystem, and transmitting the encrypted symmetric encryption key to the system log analyzer;

the system log generator encrypting a system log using the symmetric encryption key and transmitting the encrypted system log to the system log analyzer;

the system log analyzer (1) performing, by means of the encrypted symmetric encryption key, transcryption of the encrypted system log to obtain a system log encrypted by the public key of the homomorphic cryptosystem, (2) performing processing of the encrypted system log in a homomorphic domain to obtain an analysis result in the homomorphic domain, the processing including correlating two or more events in the encrypted system log that deviate from an expected behaviour, and determining a level of risk associated with the correlated two or more events, and (3) transmitting the analysis result in the homomorphic domain as well as the encrypted symmetric encryption key to the security operations center;

the security operations center decrypting, using the private key of the homomorphic cryptosystem, the encrypted symmetric encryption key, as well as the analysis result obtained in the homomorphic domain, to obtain the symmetric encryption key and a cleartext analysis result, respectively, establishing a security report or providing a countermeasure from the cleartext analysis result, encrypting the security report or countermeasure by means of the symmetric encryption key, and transmitting the encrypted security report or countermeasure to the system log generator;

the system log generator decrypting, by means of the symmetric encryption key, the encrypted security report or countermeasure to obtain the cleartext security report or countermeasure.

* * * * *